(12) United States Patent
Schmid et al.

(10) Patent No.: US 11,705,791 B2
(45) Date of Patent: Jul. 18, 2023

(54) UNIT, DEVICE, APPARATUS AND METHOD FOR BENDING AND PRODUCING WAVE WINDINGS FOR COIL WINDINGS OF ELECTRIC MACHINES

(71) Applicant: GROB-WERKE GMBH & CO. KG, Mindelheim (DE)

(72) Inventors: Frederik Schmid, Altenstadt (DE); Ralf Rauscher, Fellheim (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 477 days.

(21) Appl. No.: 16/765,689

(22) PCT Filed: Nov. 22, 2018

(86) PCT No.: PCT/DE2018/100954
§ 371 (c)(1),
(2) Date: Jun. 19, 2020

(87) PCT Pub. No.: WO2019/101272
PCT Pub. Date: May 31, 2019

(65) Prior Publication Data
US 2022/0352795 A1    Nov. 3, 2022

(30) Foreign Application Priority Data
Nov. 22, 2017 (DE) .......................... 102017127634.3

(51) Int. Cl.
*B21D 7/06* (2006.01)
*H02K 15/04* (2006.01)

(52) U.S. Cl.
CPC ........... *H02K 15/0478* (2013.01); *B21D 7/06* (2013.01)

(58) Field of Classification Search
CPC .......... B21D 7/06; B21D 11/06; B21D 11/07; B21D 13/02; B21D 15/12; B21D 19/086; H02K 15/0478
See application file for complete search history.

(56) References Cited

U.S. PATENT DOCUMENTS

| | | | | |
|---|---|---|---|---|
| 3,306,093 A | * | 2/1967 | Sassak ................. | B21D 5/0263 72/389.8 |
| 5,588,322 A | * | 12/1996 | Passone ................. | B21D 11/07 72/298 |

(Continued)

FOREIGN PATENT DOCUMENTS

| | | |
|---|---|---|
| DE | 10328955 A1 | 2/2005 |
| DE | 102005032478 A1 | 1/2007 |

(Continued)

OTHER PUBLICATIONS

German Search Report; priority document.

(Continued)

*Primary Examiner* — Teresa M Ekiert
(74) *Attorney, Agent, or Firm* — Greer, Burns & Crain, Ltd.

(57) ABSTRACT

A bending unit for bending a bend of a wave winding for a coil winding of an electric machine, having a first holding element for holding a first segment of a wire to be bent, a second holding element for holding a second segment of the wire to be bent and at least one bending mold for bending a transition region of the wire between the first segment and the second segment. The first and the second holding elements are in engagement with each other via at least one mechanical control cam to control a relative pivoting and a relative displacement of the first and the second holding element. Furthermore, a bending device having a plurality of such bending units, a wave winding production apparatus having a plurality of bending units which are synchronized (Continued)

via control cams, and a bending method and a wave winding production method are described.

19 Claims, 5 Drawing Sheets

(56) References Cited

U.S. PATENT DOCUMENTS

| | | | |
|---|---|---|---|
| 6,460,395 B1 * | 10/2002 | Courtney | B21D 7/08 |
| | | | 72/298 |
| 7,185,414 B2 | 3/2007 | Sadiku | |
| 7,269,988 B2 | 9/2007 | Kobayashi | |
| 8,230,578 B2 | 7/2012 | Knappenberger | |
| 8,333,098 B2 | 12/2012 | Saito et al. | |
| 8,341,824 B2 | 1/2013 | Takada et al. | |
| 2009/0276997 A1 | 11/2009 | Akimoto et al. | |
| 2010/0231083 A1 | 9/2010 | Hashimoto et al. | |
| 2011/0278980 A1 | 11/2011 | Hara et al. | |
| 2016/0052041 A1 | 2/2016 | Murphy et al. | |

FOREIGN PATENT DOCUMENTS

| | | |
|---|---|---|
| DE | 102009008615 A1 | 8/2009 |
| DE | 112010000452 A1 | 8/2012 |
| DE | 102015218379 A1 | 3/2017 |
| EP | 1270104 A1 | 1/2003 |
| EP | 2380674 A2 | 10/2011 |
| FR | 2632789 T5 | 12/1989 |
| GB | 1298666 A | 12/1972 |
| JP | 2011103745 A | 5/2011 |
| WO | 2017148619 A1 | 9/2017 |

OTHER PUBLICATIONS

International Search Report; priority document.
European Office Action for corresponding European Patent Application No. 18819447.6 dated Jun. 16, 2021.

* cited by examiner

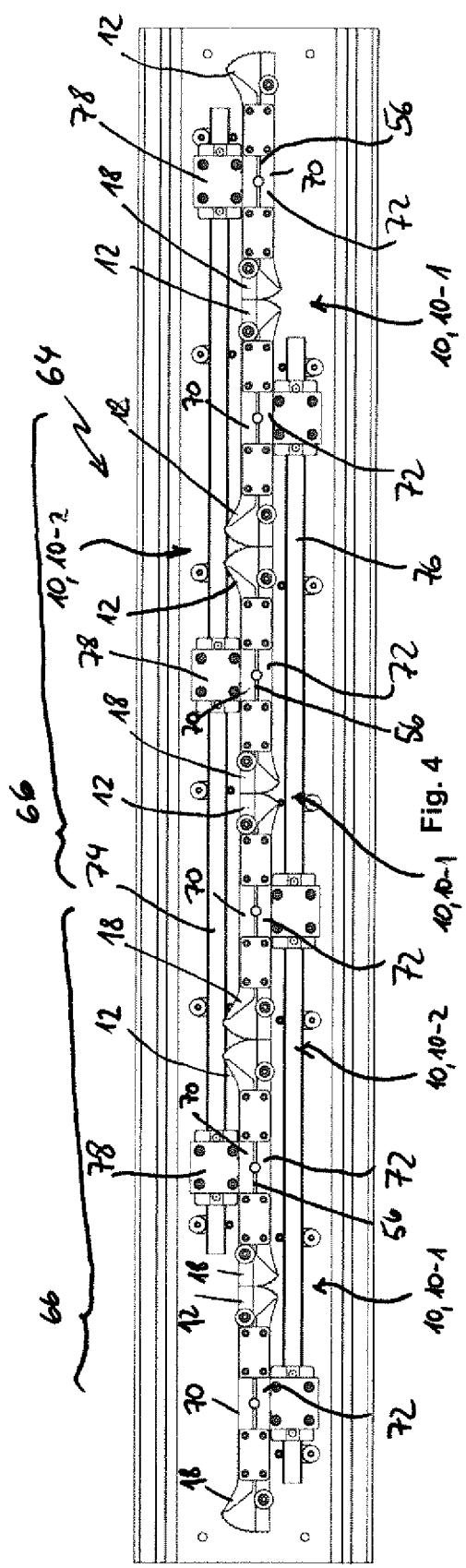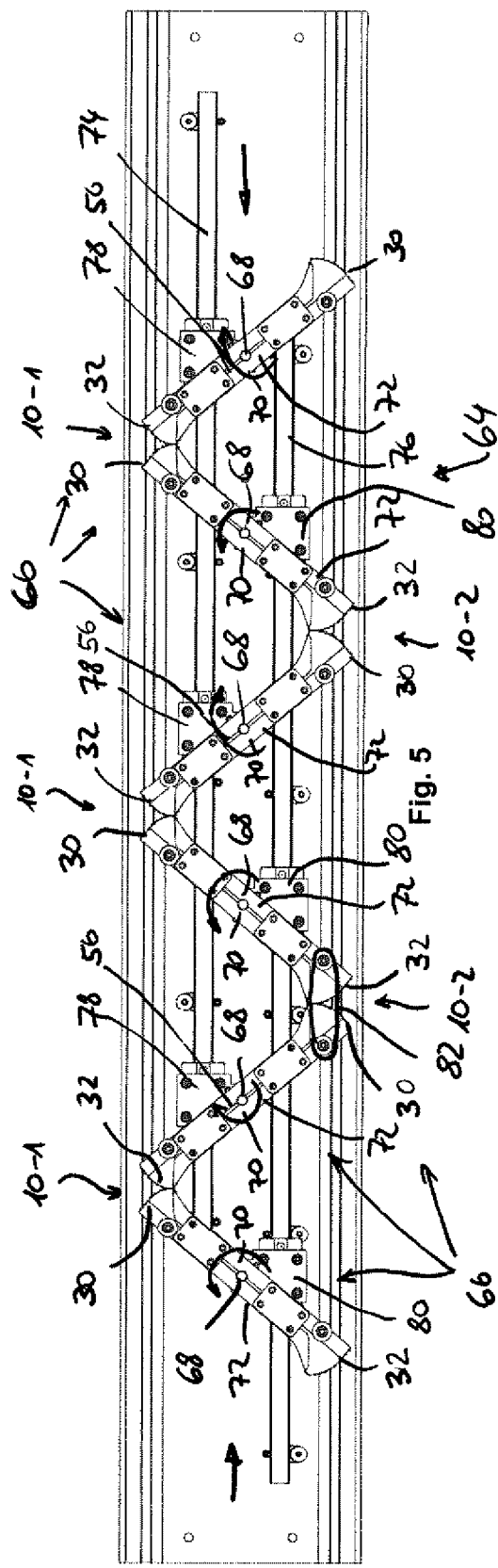

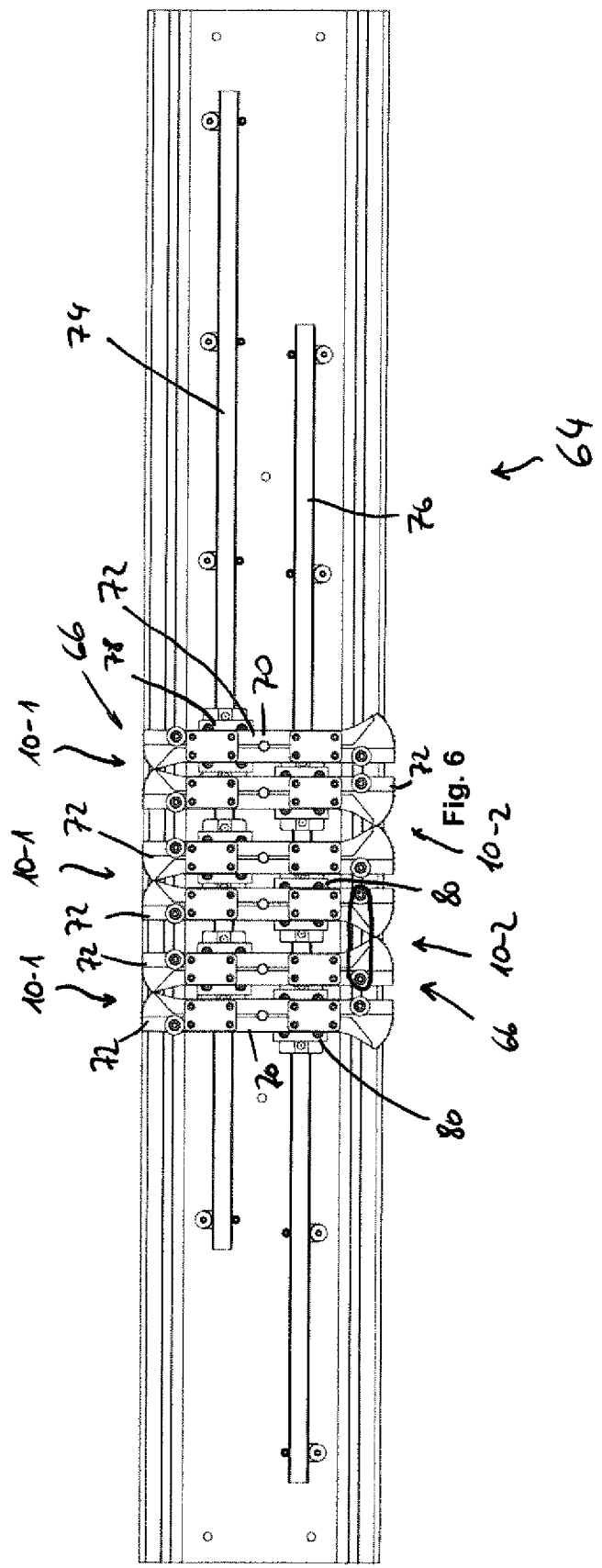

UNIT, DEVICE, APPARATUS AND METHOD FOR BENDING AND PRODUCING WAVE WINDINGS FOR COIL WINDINGS OF ELECTRIC MACHINES

CROSS-REFERENCES TO RELATED APPLICATIONS

This application claims the benefit of the International Application No. PCT/DE2018/100954, filed on Nov. 22, 2018, and of the German patent application No. 102017127634.3 filed on Nov. 22, 2017, the entire disclosures of which are incorporated herein by way of reference.

FIELD OF THE INVENTION

The invention relates to a bending unit for bending a bend of a wave winding for a coil winding of an electric machine. Furthermore, the invention relates to a bending device for shaping a wave shape of a wave winding for a coil winding of an electric machine. Furthermore, the invention relates to a wave winding production apparatus for producing a wave winding for an electric machine. Furthermore, the invention relates to a bending method for bending a bend of a wave winding for a coil winding of an electric machine. Finally, the invention relates to a wave winding production method for producing a wave winding for a coil winding of an electric machine.

BACKGROUND OF THE INVENTION

For the technological background, reference is made to the following citations:
[1] WO 2017/148619 A1
[2] EP 1 270 104 A1
[3] US 2016/052041 A1
[4] US 2010/231083 A1
[5] US 2009/276997 A1.

The present invention resides in the field of producing electric motors or other electric machines, such as, for example, generators, which are designed for high powers, reliable operation and high efficiency. In particular, the intention is to produce electric motors which can be used as drive motors of electric vehicles or hybrid vehicles and have, for example, a rated output of between 20 kW and 400 kW. It is advantageous to provide as high a coil density as possible for constructing stators of such powerful electric machines. For this purpose, it is known from citations [1], [3] and [5] to provide a wave winding in which wire segments of a wire are provided with bends which can be fitted into radially open grooves of a holding body, such as, in particular, the main body of a stator or rotor. In order to achieve a particularly high degree of filling, the coil windings are produced, in particular, from wires having a rectangular cross section, for which particular bending methods and wave winding production apparatuses that have bending devices with bending units are proposed in citations [1], [3] and [5]. In this case, a bending unit serves for producing a bend. A bending device for bending adjacent bends has a first bending unit and a second bending unit. A wave winding production apparatus has a plurality of such bending devices.

Further bending units, bending devices and machines having a plurality of such bending devices are known from the additional citations [2] and [4].

Citation [1] describes an apparatus for producing a wire segment which is bent in a wave-shaped manner, in particular for use as a stator winding in an electric machine, having a linear guide and a plurality of shaping elements which are mounted in a longitudinally displaceable and rotatable manner on the linear guide and which each have a receiving region for fixing the wire segment to be bent. Mutually directed ends of the adjacent shaping elements are designed as holding elements, wherein a first holding element on the one shaping element and a second element on a second shaping element interact jointly as a bending unit in order to produce a bend. For this purpose, the shaping elements for bending the wire segment fixed thereon into a wave shape are rotatable in opposite directions and at the same time can be moved together along the linear guide. How the operation for producing bends can be synchronized is not resolved in citation [1]. The rotational and linear movements of all of the shaping elements are not coordinated with one another. Furthermore, at citation[1], the bending contour of the wire is completely undefined during the bending operation since the individual shaping elements have only end stops with respect to one another, but are not synchronized with one another during the actual process. The wire is therefore curved with an undefined shape. Furthermore, citation [1] does not contain any solution for driving the apparatus, either for the linear movement or the rotational movement of the shaping elements.

A bending machine for bending tubes, such as, for example, tubes for a fuel line of motor vehicles or tubes for a cooling coil, is known from citation [2]. The bending behavior of tubes of this type basically differs from the bending of a wire segment with a rectangular cross section. In order to be able to bend tubes of this type without the internal cross section of the tube collapsing, the bending machine has bending units with a shaping element in the form of a cylinder body, about which the tubes are bent with two holding elements. For this purpose, a rack is provided on the one holding element and a pinion meshing with the rack is provided on the other holding element. In the bending machine, a plurality of bending devices having bending units of this type are coupled to one another, thus providing an apparatus for producing a tube bent in a wave-shaped manner, wherein each bend is bent around a round shaping element. The sequence is synchronized in this case by racks and spur gears in the individual bending units. It is not possible with this apparatus to shape a contour in the bend since the bend can be bent only around a predetermined radius about the center point of the spur gear. Furthermore, a relative movement arises between the individual holding elements of the tubes because of the type of toothing A further disadvantage is that the rectilinear sections cannot be securely clamped in the apparatus, but rather can only be pressed against a stop on one side.

An apparatus for producing a wire segment bent in a wave-shaped manner is known from citation [3]. In this case, sliders are displaced counter to one another with the aid of a spindle and at the same time moved together transversely with respect to the pulling movement. The uniform moving together of the individual sliders is ensured here by means of scissor kinematics. For this purpose, only three axes need to be electrically synchronized. The shape of the bending heads, i.e. of the individual bends of the wire, is formed in the method known from citation [3] by the shape of the slider. In the method known from citation [3], the rectilinear sections are not fixedly clamped in the apparatus but rather are pulled straight simply because of the tension between the individual sliders. The loading for the wire is very high here since the bending head is intended to be shaped in the same step and the tensile force required for this purpose directly leads to a lengthening of the wire.

An apparatus for producing a wire segment bent in a wave-shaped manner with a rectangular bending head is known from citation [4]. The shape is produced here by a plurality of pivot points in individual shaping elements. The wire is clamped fixedly in rectilinear sections such that these sections remain exactly rectilinear. In the method known from citation [4], only a small section of a wave winding mat can ever be produced, which leads to cycle time problems. In addition, the possible head shape is highly limited.

An apparatus for producing a wire segment bent in a wave-shaped manner with a rectangular bending head is known from citation [5]. The shape is produced here by a plurality of pivot points in a shaping elements. In a second step, the final head shape is formed. Even in the method known from citation [5], only a small section of a wave winding mat can ever be produced at once, which leads to cycle time problems. In addition, a plurality of process steps are required.

SUMMARY OF THE INVENTION

It is an object of the invention to provide a unit, a device, an apparatus and a method for bending and producing wave windings for coil windings of electric machines, with which individual bending sequences can be synchronized more simply.

A corresponding wave winding production apparatus is intended to be designed, in particular, in such a manner that it is synchronized such that as few drives as possible are required.

To achieve this object, the invention provides a bending unit for bending a bend of a wave winding for a coil winding of an electric machine as claimed in claim 1.

A bending device for shaping a wave shape of a wave winding for a coil winding of an electric machine, comprising a plurality of such bending units, a wave winding production apparatus for producing a wave winding for a coil winding of an electric machine, comprising a plurality of such bending devices, a bending method for bending a bend of a wave winding for a coil winding of an electric machine, which bending method can preferably be carried out with the bending unit, and a wave winding production method, in which a plurality of such bends are carried out, are also provided.

The invention, according to a first aspect thereof, provides a bending unit for bending a bend of a wave winding for a coil winding of an electric machine, having a first holding element for holding a first segment of a wire to be bent, a second holding element for holding a second segment of the wire to be bent and at least one bending mold for bending a transition region of the wire between the first segment and the second segment, wherein the first and the second holding elements are in engagement with each other via at least one mechanical control cam in order to control a relative pivoting and a relative displacement of the first and the second holding element.

It is preferred that at least part of the control cam or of one of a plurality of control cams is connected rigidly to the first holding element or to the second holding element, and, in particular, is formed on the first or the second holding element.

It is preferred that all of the components of the control cam or of one of a plurality of control cams are connected rigidly to the first holding element or to the second holding element, in particular are formed on the first or the second holding element.

The at least one control cam is preferably formed on at least one of the holding elements.

It is preferred that the at least one control cam has regions of different curvature.

It is preferred that the at least one control cam has a rectilinear region or end region and a curved region or end region.

It is preferred that the at least one control cam has an ellipsoidal cam region differing from a circular shape.

It is preferred that the at least one control cam has a curvature which increases in steps and/or gradually, as seen from one end region to another end region.

It is preferred that the at least one control cam is configured depending on the bending mold in such a manner that the wire is kept tensioned during the entire bending operation.

In one conceivable refinement, the at least one control cam can be formed on a holding element, and with a gripping element formed on the other holding element moving along the control cam.

It is preferred that the first holding element has a first control cam and the second holding element has a second control cam in such a manner that the first and the second control cam roll away on each other as rolling cams.

The first and the second control cam can be in engagement here in a frictionally locking and/or form-fitting manner. For example, each of the control cams can be provided with a roll-away region or rolling region at which the control cams act in a frictionally locking manner on each other.

It is preferred that complementary projection/recess formations and/or toothings are formed on the first and the second control cam in order to create a form-fitting engagement between the first and the second holding element.

It is preferred that a first region of the bending mold is formed on the first holding element and a second region of the bending mold is formed on the second holding element.

It is preferred that the first region and the second region of the bending mold each have at least one rectilinear region between two curved regions.

It is preferred that the first region and the second region of the bending mold are formed in a mirror-inverted manner with respect to each other.

It is preferred that the first and the second holding element each have a groove receptacle or guide groove for holding the first or second segment in place.

It is preferred that the first and the second holding element are prestressed elastically in the direction of engagement with each other by means of at least one prestressing device.

It is preferred that the bending unit has at least one counterbending element for carrying out a counterbend, which counterbending element, when the first and second holding elements are pivoted with respect to each other in order to carry out the bend, is movable toward the holding elements in order to carry out the counterbend between the holding elements and the counterbending element.

The at least one counterbending element is preferably designed as a punch which is displaceable relative to the holding elements.

Each of a plurality of bending units of a wave winding production apparatus is preferably assigned at least one counterbending element.

The at least one bending mold preferably has an indentation, with the counterbending element being configured to bend the wire in the direction of the indentation.

The counterbending element preferably has at least one indentation for receiving the bend of the coil winding, and at least one projection adjacent to the indentation for bending a region of the wire that adjoins the bend.

According to a further aspect, the invention provides a bending device for shaping a wave shape of a wave winding for a coil winding of an electric machine, comprising a first bending unit according to one of the preceding refinements and a second bending unit according to one of the preceding refinements, wherein one of the holding elements of the first bending unit and one of the holding elements of the second bending unit are connected to each other by means of a rigid connecting element which is rotatable about a pivot point.

It is preferred that the connecting element and the holding elements which are connected by the latter are formed integrally on a shaping element for shaping a rectilinear wire segment located between two bends.

According to a further aspect, the invention provides a wave winding production apparatus for producing a wave winding for a coil winding of an electric machine, comprising a plurality of bending devices according to one of the preceding refinements and at least one linear guide for the first and/or the second holding elements and/or the first and/or the second bending units and/or the connecting elements and/or the shaping elements.

It is preferred that respectively adjacent connecting elements or shaping elements are coupled by the engagement via the control cams of the bending units in order to synchronize their displacement movements along the at least one linear guide and rotational movements.

It is preferred that pivot points of the connecting elements or shaping elements lie on a line running longitudinally or parallel to the linear movement direction.

It is preferred that at least two bending units which are adjacent in the linear movement direction are arranged and/or formed in a mirror-inverted manner.

It is preferred that at least one or a plurality of elastic components are provided for holding together the connecting elements or shaping elements.

The wave winding production apparatus preferably has a counterbending device with at least one counterbending element, preferably with, in each case, at least one counterbending element per bending unit, for carrying out a counterbend on the bend carried out by the bending unit.

The counterbending elements are preferably arranged at the locations where the holding elements of the bending units are located after relative pivoting has been carried out, wherein the counterbending elements are designed to be moved toward the holding elements in order to carry out the counterbend. Punches are preferably provided as counterbending elements.

According to a further aspect, the invention provides a bending method for bending a bend of a wave winding for a coil winding of an electric machine, comprising:

holding a first segment of a wire to be bent by means of a first holding element, holding a second segment of the wire to be bent by means of a second holding element, bending a transition region of the wire between the first segment and the second segment by means of a bending mold, and controlling a relative pivoting and a relative displacement of the first and the second holding element during the bending of the transition region by means of a mechanical control cam via which the first and the second holding element are in engagement, wherein the control cam is selected depending on the bending mold in order to hold the transition region against the bending mold during the bending operation.

The control cam is preferably selected here depending on the bending mold in order to keep the transition region tensioned against the bending mold during the bending operation.

The bending method preferably comprises:

keeping the first and the second holding element in engagement by means of the at least one control cam in such a manner that at least part of the control cam or of one of a plurality of control cams is connected rigidly to the first holding element or to the second holding element, and in particular is formed on the first or the second holding element.

The bending method preferably comprises:

keeping the first and the second holding element in engagement by means of the at least one control cam in such a manner that all of the components of the control cam or of one of a plurality of control cams are connected rigidly to the first holding element or to the second holding element, in particular are formed on the first or the second holding element.

The bending method preferably comprises:

carrying out a counterbend by means of at least one counterbending element after relative pivoting of the holding elements has taken place.

According to a further aspect, the invention provides a wave winding production method for producing a wave winding for a coil winding of an electric machine, comprising synchronous bending of a plurality of bends by means of the bending method of the abovementioned type in bending units which follow one another in the longitudinal direction of the wire and each have a first holding element and a second holding element which are in engagement by means of the control cam, wherein bending units following one another are coupled by means of rotatably and displaceably mounted rigid connecting elements.

Preferred refinements of the wave winding production method comprise at least one, a plurality or all of the following steps:

a) using a wave winding production apparatus according to one of the refinements explained above, b) inserting or pulling the rectilinear wire into the wave winding production apparatus in an expanded state in which guide grooves on the holding elements or shaping elements are oriented with respect to one another, c) uniformly moving together and oppositely rotating the connecting elements or shaping elements in order to bend the bends, d) removing the wire which has been bent to form a wave winding after the pushed-together end position is reached.

The holding elements are preferably configured in such a manner that the first and the second segment are fixedly clamped.

Preferably, at step c), a defined overbending and then movement again of the segments into an end position takes place.

By this means, the segments of the fully bent wave winding can be oriented parallel.

Since the wire after bending always springs back a little, it is advantageous to overbend the wire, i.e., to bend it further than is required for the finished wire shape, so as to take the springing back into consideration and therefore to achieve the desired end shape.

It is preferred here that the holding elements are formed with grooves or similar receptacles for surrounding, on both sides, a first segment and a second segment, between which the bend is intended to be undertaken.

There are various winding methods for producing the basic shape of a wave winding. The invention present here relates, in particular, to what is referred to as flat winding. The aim in the case of flat winding is to bend the wire with a rectangular cross section as gently as possible into the desired shape in one plane. This can be achieved particularly advantageously with the units, devices, apparatuses and methods according to the claims appended here. While the apparatuses known hitherto from citations [1] to [5] permit only production of generally rectangular or undefined head shapes, an adaptation to different shaping elements can take place with bending units according to preferred refinements of the invention.

In particularly preferred refinements, segments are clamped or at least guided in holding elements of the bending unit. This counteracts deformations which may occur in the case of known apparatuses in the parallel rectilinear sections between the bends since these sections in the case of the known apparatuses are bent freely in space and are not guided or clamped. In addition, in preferred refinements of the invention, a relative movement between the wire and the bending unit or the holding elements thereof, which could cause damage, can be counteracted.

In a preferred refinement of the wave winding production apparatus, for the production of a uniform wave winding mat, the entire sequence is synchronized, i.e., the simultaneous rotational and linear movements of all of the shaping elements can take place uniformly and in a regulated manner.

One problem with the apparatuses from citations [1] to [5] is that, although each shaping element has the same rotational angle, all of the shaping elements have different linear movement paths. Coupling via a rack and a plurality of spur gears is therefore not expedient. To drive all of the axles individually would be very expensive since a wire which is bent to form a wave winding may have more than 60 turns; in addition, all would then still have to be synchronized and monitored via 120 drives (in each case one rotational drive and one linear drive per shaping element). In addition, it is advantageous to keep the wire under tension in a defined manner in order to achieve a consistent head shape.

In the case of the bending unit according to the invention, the movement of adjacent holding elements and/or adjacent shaping elements, at the ends of which the holding elements are formed, is synchronized via at least one mechanical control cam.

In a preferred refinement of the wave winding production apparatus, the shaping elements are brought together on one or more linear guides and the shaping elements are, at the same time, rotated in opposite directions. Adjacent shaping elements are in engagement with each other here via at least one mechanical control cam for synchronizing their movements. For example, the shaping elements roll away on one another on special rolling cams. The control cams, in particular rolling cams, are preferably configured in such a manner that the wire is kept under tension during the entire bending operation. This permits the bending about a plurality of bending radii and also rectilinear sections with just one movement, as a result of which more complex head shapes can be produced.

The rolling cams can be in engagement with one another purely via a frictional lock. The rolling cams are preferably in engagement with one another via a form-fitting connection. A toothing is particularly preferably provided along the rolling cam, this toothing, resulting in a form-fitting connection in addition to a frictional lock, which permits a symmetrical and uniform bending operation, and therefore permits a precise synchronization.

A number of advantages of preferred refinements of the invention will be explained in more detail below.

In contrast to the prior art, the shaping elements preferably have a special roll-away cam synchronizing all of the required movements with one another.

An additional form-fitting connection of a toothing on the rolling cams gives rise to a secure kinematic coupling of the shaping elements with the respective neighbors, which leads to the entire bending chain being linked together as precisely as possible.

The roll-away cam can optionally be configured in such a manner that there is always a desired tension on the wire. As a result, the head can be bent directly into a defined shape since it fits tightly onto the shaping elements. A uniformly defined overbending and the production of different distances between, for example, parallel rectilinear sections is also possible.

An additional form-fitting connection to the rolling cams gives rise to a secure kinematic coupling of the shaping elements with the respective neighbors, which leads to the entire bending chain being linked together. By contrast to the prior art, this permits the bending of a wire of any length, with any number of turns with just one driven axis.

By exchanging individual shaping elements, any number of very varied head shapes and distances between the rectilinear sections can be produced here.

The shaping elements are preferably mounted rotatably on one or more linear guides. They are preferably arranged here in such a manner that the ends always engage in one another in a reflected manner and the axes of rotation of the shaping elements lie on a line which is parallel to the linear guides.

The individual shaping elements are preferably held together by elastic components in order to ensure that the holding elements on their at least one control cam are always in engagement. For example, a toothing on the rolling cams can thus always be kept in engagement by means of elastic forces.

The bending operation preferably has primarily three steps, as is illustrated more precisely below.

The wire can optionally still be overbent before the end position is reached, and the degree of the overbending can be set by means of stops on roller shoes or other elements of the shaping elements or of the holder thereof.

In a first step, the wire is inserted or pulled into the rectilinear apparatus.

In a second step, the shaping elements are preferably uniformly moved together and rotated in opposite directions.

In a third step, movement into an end position takes place. It can optionally be provided here that the segments are moved beforehand beyond the end position in order to carry out overbending and only then does a movement into the end position take place.

In a further refinement of the method, it is provided that, after the end position of the shaping elements is reached, a counterbend is formed in the wave head with one or more punches—for example for counterbending elements. The springing back of the wire after removal from the apparatus is thereby reduced. In addition, the wire can be removed more easily because of the low tension.

The wave winding can subsequently be removed.

BRIEF DESCRIPTION OF THE DRAWINGS

An exemplary embodiment will be explained in more detail below with reference to the attached drawings, in which:

FIG. 4 shows a schematic top view of a wave winding production apparatus for producing a wave winding for a coil winding of an electric machine, comprising a plurality of bending devices which contain a plurality of bending units of the type illustrated in FIG. 1, wherein the wave winding production apparatus is in the initial position prior to bending of a wave winding;

FIG. 5 shows a top view of the wave winding production apparatus in the intermediate position;

FIG. 6 shows a top view of the wave winding production apparatus in the end position at the end of a bending operation;

DETAILED DESCRIPTION OF THE PREFERRED EMBODIMENTS

Figure 1:
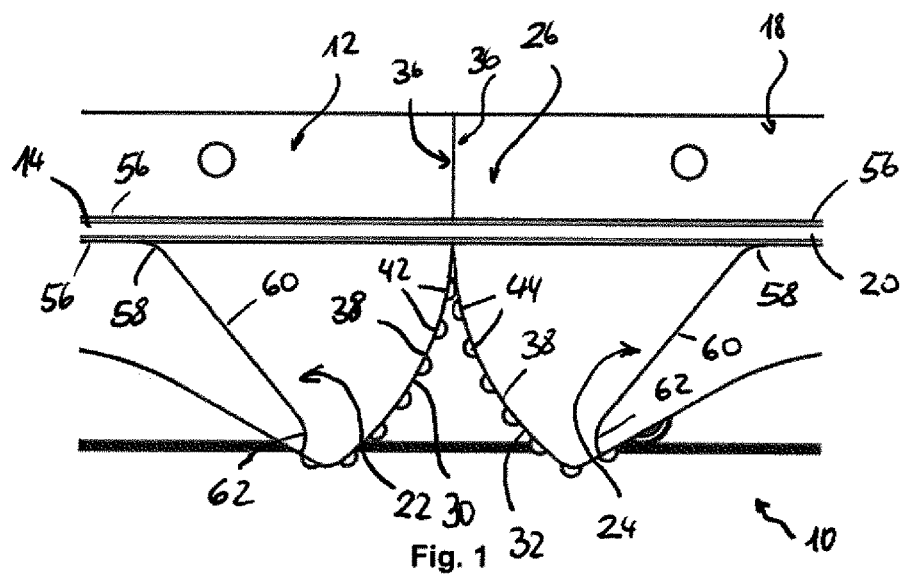
FIG. 1 shows a schematic illustration of an embodiment of a bending unit for bending a bend of a wave winding for a coil winding of an electric machine in an expanded starting position prior to bending.
Figure 2:
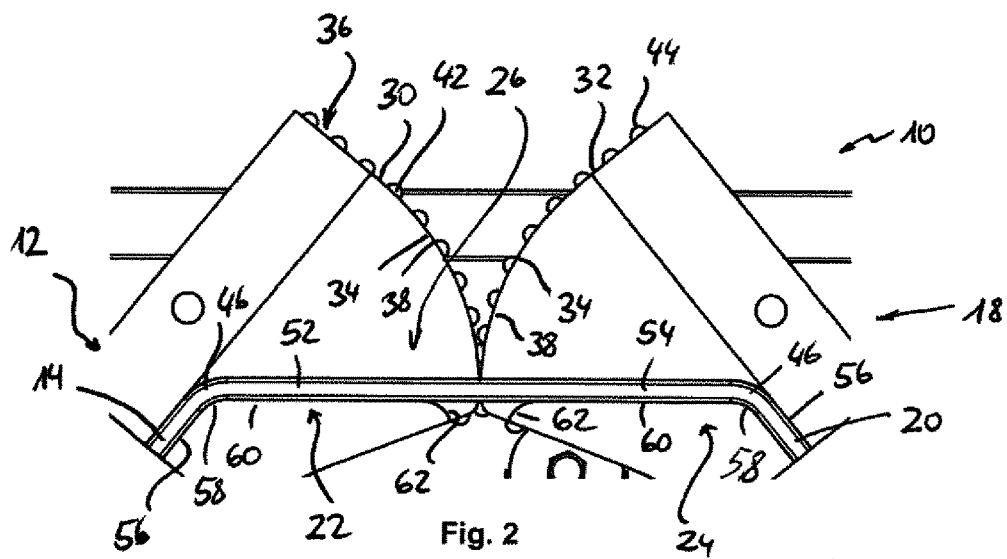
FIG. 2 shows a schematic illustration of the bending unit comparable to the illustration of FIG. 1, wherein the bending unit is in an intermediate position during the bending.
Figure 3:
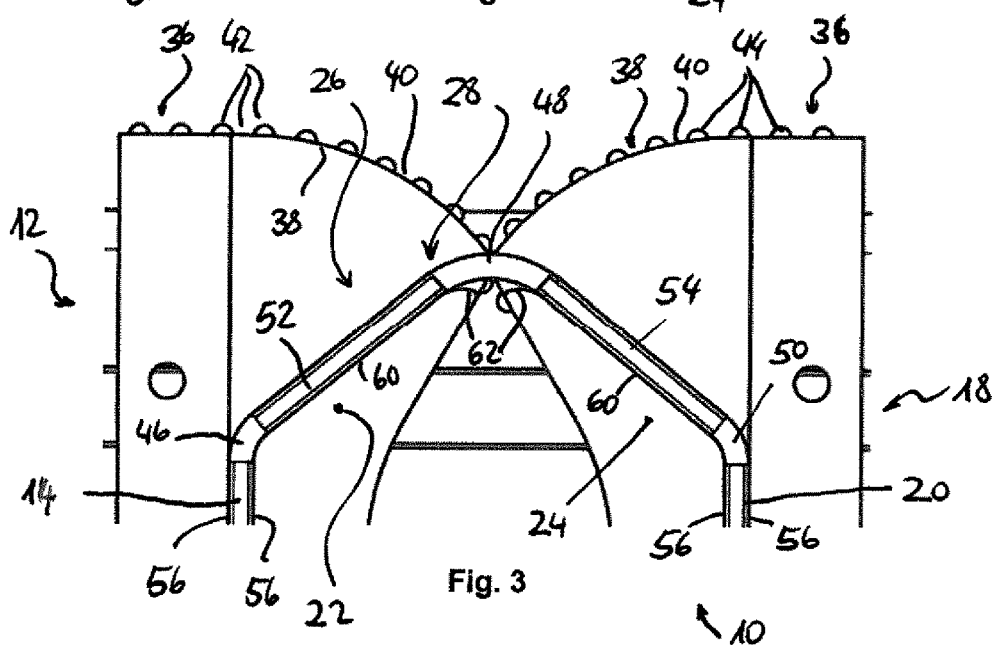
FIG. 3 shows an illustration comparable to FIGS. 2 and 3, wherein the bending unit is in an end position at the end of a bending operation.
Figure 10:
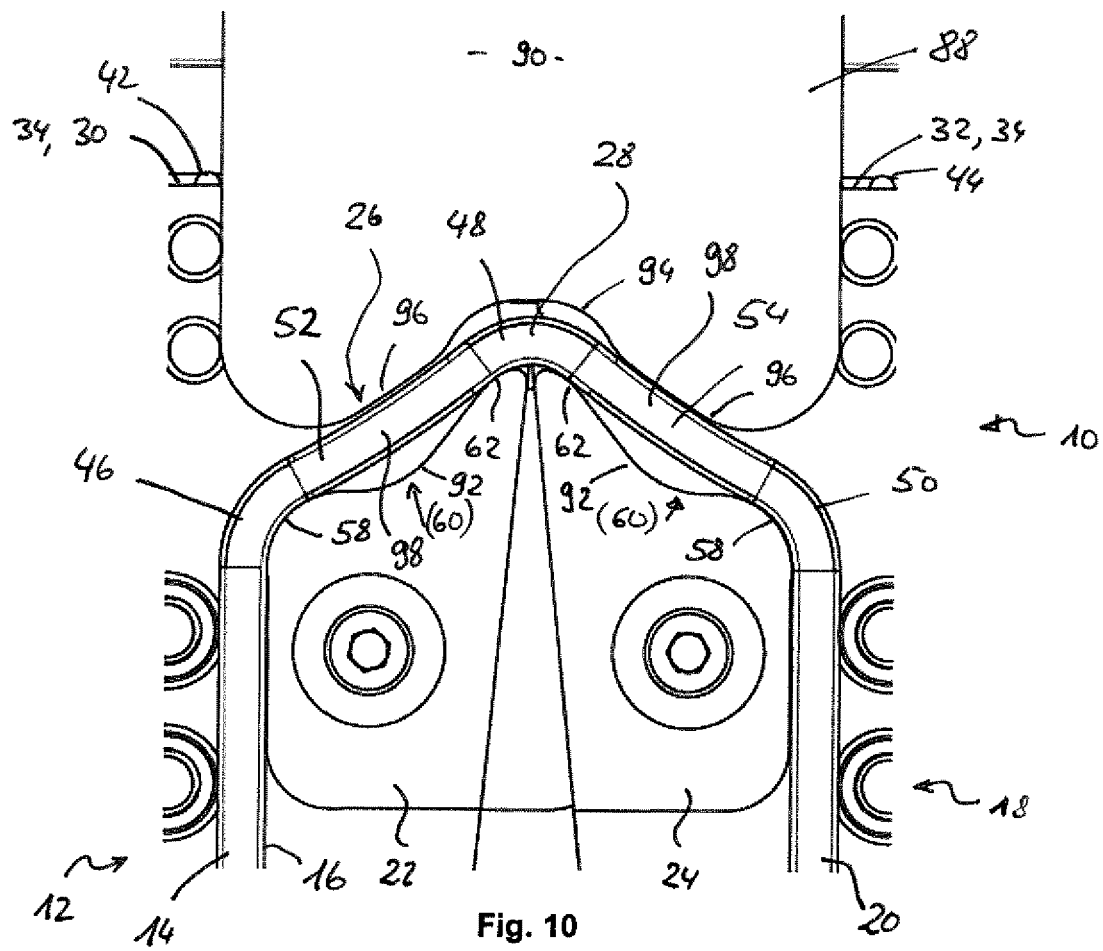
FIG. 10 shows a view comparable to FIG. 3 of a further refinement of the bending unit in the end position.

FIGS. 1 to 3 illustrate a first embodiment of a bending unit 10 for bending a bend of a wave winding for a coil winding of an electric machine in different positions during a bending operation. FIG. 1 shows the bending unit 10 in an initial position prior to the bending operation; FIG. 2 shows the bending unit 10 in an intermediate position during the bending operation and FIG. 3 shows the bending unit at an end position after the bending operation has been carried out. FIG. 10 shows a view comparable to FIG. 3 of a further embodiment of the bending unit 10 in the end position.

In the embodiments shown, the bending unit 10 has a first holding element 12 for holding a first segment 14 of a wire 16 to be bent and a second holding element 18 for holding a second segment 20 of the wire 16 to be bent. Furthermore, the bending unit 10 has at least one bending mold 22, 24 for bending a transition region 26 of the wire 16. The transition region 26 is located between the first segment 14 and the second segment 20 and is shaped by the bending unit 10 to form a head 28. The at least one bending mold 22, 24 is configured so as to correspond to the shape of the desired head 28.

For this purpose, the first holding element 12 and the second holding element 18 are pivotable relative to each other and are displaceable relative to each other. FIGS. 1 to 3 show different relative positions of the holding elements 12, 18 to each other.

In order to control the relative pivoting and the relative displacement of the first holding element 12 and of the second holding element 18, the first holding element 12 and the second holding element 18 are in engagement with each other via at least one mechanical control cam 30, 32.

The at least one control cam 30, 32 can be configured differently in a manner corresponding to the desired bending operation and the desired shape of the head 28. The at least one control cam 30, 32 is preferably configured in such a manner that the transition region 26 is held during the bending operation against the at least one bending mold 22, 24 and is preferably also kept under tension. The at least one control cam 30, 32 is preferably configured in such a manner that, during the bending operation, relative movements between wire 16 and the holding elements 12, 18 in the longitudinal direction of the wire are minimized or avoided.

In particular, the at least one control cam 30, 32 is adapted to the respective bending shape 22, 24 in order correspondingly to control the relative pivoting and the relative displacement depending on the bending mold 22, 24.

In the exemplary embodiment illustrated in FIGS. 1 to 3, a first control cam 30 is provided on the first holding element 12, and a second control cam 32 is provided on the second holding element 18, wherein the holding elements 12, 18 grasp each other via their control cams 30, 32.

The control cams 30, 32 are designed as roll-away cams or rolling cams 34 such that the holding elements 12, 18 roll away on each other via their control cam 30, 32.

The control cams 30, 32 are preferably not circular, but rather are provided with regions of different curvature and/or with a rectilinear region 36 and a curved region 38. In particular, the control cams 30, 32 are configured in such a manner that they grasp each other in an initial position via a rectilinear end region 36, and a curved region 38 having a gradually increasing curvature adjoins the latter. The curved region 38, for example in cross section, can have the shape of a region of an ellipse and can therefore be shaped ellipsoidally.

In a refinement which is not illustrated specifically, the control cams 30, 32 are purely in pure frictional engagement via flat frictional surfaces—the roll-away surface 40. However, in the embodiment illustrated, in addition to a roll-away surface 40, a first toothing 42 is also provided on the first control cam 30 and a second toothing 44 is provided on the second control cam 32. The first and the second toothings 42, 44 are complementary to each other, and therefore the control cams 30, 32 are in form-fitting engagement via their toothings 42, 44.

In order to form the at least one bending mold 22, 24, in the illustrated embodiment of the bending unit 10, a first bending mold 22 is provided on the first holding element 12 and a second bending mold 24 is provided on the second holding element 18.

The first bending mold 22 serves as a partial region of an overall bending mold for shaping a first partial region of the head 28, and the second bending mold 24 serves as a further partial region of the overall bending mold for shaping a second partial region of the head 28.

As illustrated in FIG. 3, a roof shape of the head 28 can be produced with the illustrated bending molds 22, 24, wherein the transition region 26 between corresponding bent regions 46, 50 toward the respective segments 14, 20 has a first rectilinear section 52 and a second rectilinear section 54 and also a central curved region 48 between the two rectilinear sections 52, 54. In the illustrated embodiment, the roof shape of the head 28 is symmetrical; this may be different in other embodiments.

In accordance with the configuration of the head 28, in the illustrated embodiment the first bending mold 22 is formed symmetrically to the second bending mold 24; however, this does not necessarily have to be the case; a pairing of asymmetrical bending molds 22, 24 in a bending unit 10 may also be provided depending on the desired shape of the head 28.

In the illustrated embodiment, each bending mold 22, 24 in a transition region to a guide groove 56, which is provided for holding and fixing the respective segment 14, 20, has a first curved region 58, a rectilinear region 60 adjoining the latter, and a second curved region 62 adjoining the latter.

The guide groove 56 serves for fixing the segments 14, 20 during the bending operation. By the wire 16 being held in place on both sides in the guide groove 56, the respective segment 14, 20 is fixed both during the pivoting of the respective holding element 12 in the one pivoting direction and also during the bending by rotation of the holding element 12, 18 in the oppositely directed pivoting direction. Instead of a guide groove 56, the respective holding element can also have any other shape for a fixing wire receptacle which meets this function, for example a tubular section, two opposite holding jaws, etc.

FIG. 1 shows the bending unit 10 in the initial position. The first holding element 12 and the second holding element 18 are oriented with respect to each other here in such a manner that their guide grooves 56 are aligned with each other. The wire 16 is placed unbent into these guide grooves 56 of the first and the second holding element 12, 18.

The distance between the outer bending radii—formed by the first curved regions 58—corresponds to the length of the neutral fibers of the bending head 28.

FIG. 2 illustrates the bending unit 10 in an intermediate position in which the holding elements 12, 18 are pivoted with respect to each other and are displaced with respect to each other by their axes of rotation—located outside the picture in FIGS. 1 to 3. In this intermediate position, the wire 16 is bent around the respective first bending radius which is formed by the respective first curved regions 58. Owing to the rolling cam 34 of the first and second control cams 30, 32, the wire 16 and, in particular, the transition region 26 is pulled under tension and thus against the first curved regions 58 and is placed against the rectilinear regions 60 of the bending mold 22, 24. The rolling thus does not give rise to any rounding in the transition region between the first curved regions 58, but rather in a defined manner to a rectilinear section, since the wire 16 is kept under tension.

FIG. 3 shows the position in which the wire 16 is fully bent. The holding elements 12, 18 are rotated further with respect to each other, with their pivot points having been displaced further with respect to each other. The wire 16 is also bent around the second curved regions 62, and is held here by the rectilinear regions 60 such that a first radius arises at the first bent regions 46 and a second radius arises at the central bent region 48. The wire 16 is bent around both radii such that the roof shape of the head 28 arises.

FIGS. 4 to 6 illustrate a wave winding production apparatus 64 which has a plurality of bending units 10 which are movable synchronously with respect to one another. The wave winding production apparatus 64 is illustrated here in three different positions, wherein the position according to FIG. 4 corresponds to the position of the respective bending units 10 according to FIG. 1, the position of FIG. 5 corresponds to the position of the respective bending units 10 according to FIG. 2 and the position of FIG. 6 corresponds to the position of the respective bending units 10 of FIG. 3.

The wave winding production apparatus 64 has a plurality of bending devices 66 for shaping a wave shape of a wave winding for a coil winding of an electric machine. The respective bending device 66 has, in each case, a first bending unit 10-1 according to the illustrations of FIGS. 1 to 3 and a second bending unit 10-2 which is formed in a mirror-inverted manner with respect to the illustrations of FIGS. 1 to 3. The first bending units 10-1 are illustrated at the top in FIGS. 5 and 6, and the second bending units 10-2 are illustrated at the bottom in the illustrations of FIGS. 5 and 6. In the bending device 66, one 18 of the holding elements 12, 18 of the first bending unit 10-1 and one 12 of the holding elements 12, 18 of the second bending unit 10-2 are connected to each other by means of a rigid connecting element 70 which is rotatable about a pivot point 68.

Figure 7:
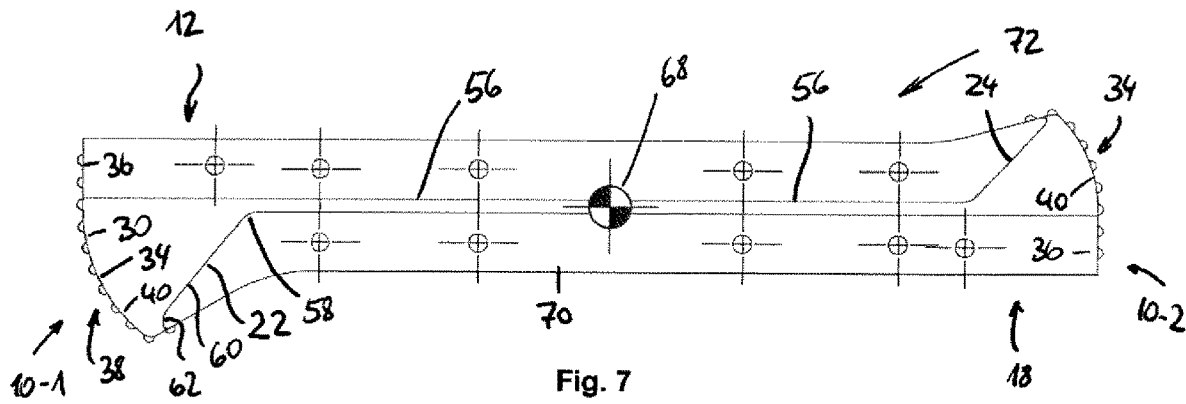
FIG. 7 shows a top view of a shaping element for forming bending devices of the wave winding apparatus of FIGS. 4 to 6.
Figure 8:
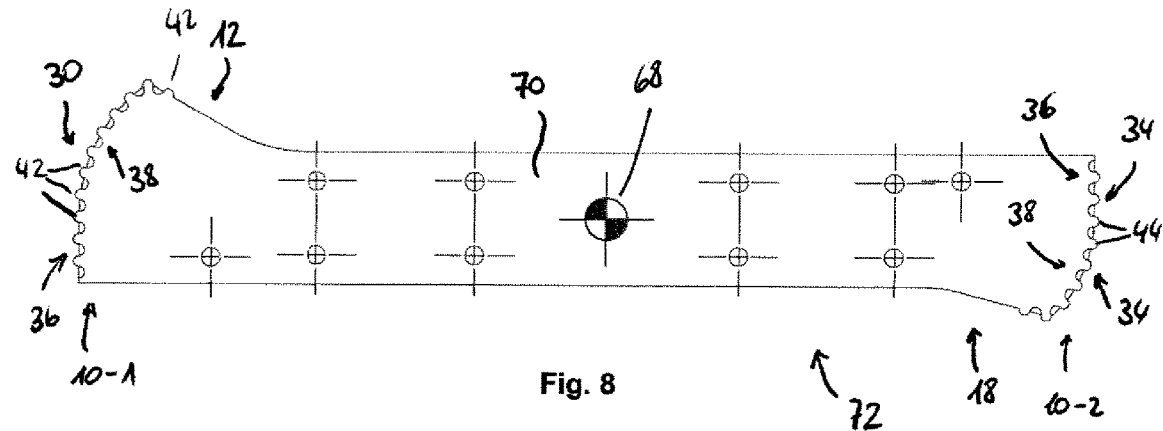
FIG. 8 shows a bottom view of the shaping element from FIG. 7.

This is achieved in the exemplary embodiments illustrated in such a manner that a plurality of shaping elements 72 are provided, of which an exemplary embodiment is illustrated in more detail in FIGS. 7 and 8. The connecting element 70 and the holding elements 12, 18 connected by the latter are formed integrally on the shaping element 72. For this purpose, a first holding element 12 is formed on a first end region of the shaping element 72, and a second holding element 18 is formed on the second end region of the shaping element 72. The shaping element 72 is designed, for example, as a flat rod element; the central region between the holding elements 12, 18 forms the connecting region 70. The guide groove 56 is preferably also formed continuously at this central region.

A pivot point 68 about which the shaping element 72 and therefore also the holding elements 12, 18 formed thereon are pivotable is preferably located approximately centrally on the shaping element, for example in the center of the connecting elements 70.

A bending device 66 is formed, for example, by three shaping elements 72 arranged adjacent to one another, and serves for the synchronous formation of two adjacent heads 28, which, however, extend in opposite directions, of the wire 16. The movement of the individual bending units 10 and of adjacent bending devices 66 and adjacent shaping elements 72 is synchronized by the engagement of the at least one control cam 30, 32 on each of the bending units 10.

As is furthermore apparent from FIGS. 4 to 6 and 9, the wave winding production apparatus 64 has at least one linear guide 74, 76 for guiding the displacement of the pivot points 68 of the shaping elements 72 with respect to one another.

In the illustrated embodiment, a first linear guide 74 is provided for guiding a first group of shaping elements 72 and a second linear guide 76 is provided for guiding a second group of the shaping elements 72. For this purpose, the shaping elements 72 are guided on carriages 78, 80, wherein first carriages 78 are guided on the first linear guide 74 and second carriages 80 are guided on the second linear guide.

The shaping elements 72 of the first group are arranged in a mirror-inverted manner with respect to the shaping elements 72 of the second group.

Figure 9:
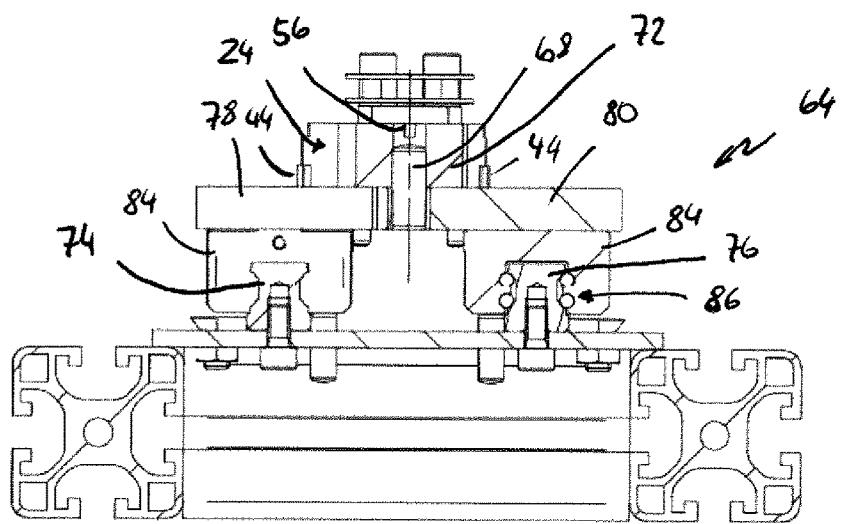
FIG. 9 shows a cross section through the wave winding production apparatus from FIG. 4 for illustrating the mounting of a shaping element on a carriage which is movable along a linear guide.

As is apparent from FIG. 9, each of the carriages 78, 80 has a roller shoe 84 with a ball bearing 86 for rolling away on a rail of the respective linear guide 74, 76. First carriages 78 of the first group of shaping elements 72 and second carriages 80 of the second group of shaping elements 72 are provided in an alternating manner in the longitudinal direction of the linear guides 74, 76. Accordingly, a shaping element 72 of the second group follows each shaping element 72 of the first group in the longitudinal direction of the linear guides 74, 76.

The shaping elements 72 can each be formed identically. In some embodiments, a plurality of different shaping elements 72 are provided corresponding to the desired shape of heads 28 following one another, in order to produce different head shapes. The respective control cams 30, 32 are in each case adapted here to the desired movement sequences for shaping the respective head 28 and to the respective bending molds 22, 24.

Owing to the linear guide 74, 76, all of the pivot points 68 of the shaping elements 72 in the illustrated embodiment lie on a line running longitudinally or parallel to the linear movement direction.

In the case of the wave winding production apparatus 64 illustrated here, two bending units 10-1 and 10-2 which are adjacent in the linear movement direction are arranged and/or formed in a mirror-inverted manner with respect to each other. However, different configurations may also be provided on the first bending unit 10-1 and on the second bending unit 10-2.

As is illustrated, for example, by a type of rubber band in the case of one of the bending units 10-2 in FIG. 2, the first holding element 12 and the second holding element 18 can be acted upon by an elastic component 82 with an elastic force which acts in the direction of engagement of the holding elements 12, 18 via the at least one control cam 30, 32. For this purpose, for example, the holding elements 12, 18 and therefore also the adjacent shaping elements 72 on which these holding elements 12, 18 are formed are prestressed in the direction toward each other. The prestressing force has the effect that the control cams 30, 32 are pressed elastically against each other, thus improving the frictional lock and/or form-fitting connection.

Each bending unit 10 can be used to carry out a bending method for bending a bend of a wave winding for a coil winding of an electric machine. The first segment 14 of the wire 16 to be bent is held by means of the first holding element 12, the second segment 20 of the wire 16 to be bent is held by means of the second holding element 18 and, furthermore, a relative pivoting and a relative displacement of the first holding element 12 and of the second holding element 18 for bending the transition region 26 with respect to the head 28 is controlled by means of the at least one mechanical control cam 30, 32, via which the holding elements 12, 18 are in engagement.

The shape of the respective control cam 30, 32 is selected depending on the respectively used bending mold 22, 24. In particular, the selection is undertaken in such a manner that the transition region 26 of the wire 16 is held against the bending mold 22, 24 during the bending operation.

This preferably takes place in such a manner that the transition region 26 is held under tension against the bending mold 22, 24.

A plurality of such bending methods for producing a plurality of bends can be carried out synchronously by means of the wave winding production apparatus 64 illustrated in FIGS. 4 to 9.

This creates a wave winding production method for producing a wave winding for a coil winding of an electric machine, wherein a plurality of the bends are carried out synchronously by means of the aforementioned bending method in bending units 10, 10-1, 10-2 following one another in the longitudinal direction of the wire 16.

In one embodiment of the wave winding production method, for this purpose the wire 16 is introduced, in particular inserted or pulled, into the mutually oriented guide grooves 56 of the shaping elements 72. This takes place in the expanded state of the wave winding production apparatus 64, as is illustrated in FIG. 4.

Subsequently, the shaping elements 72 are moved together uniformly and in opposite directions and are rotated in relation to one another, as is illustrated in FIG. 5. In the process, bending of the transition regions 26 takes place, as has been explained for the individual transition region 26 with reference to the illustrations of FIGS. 1 to 3.

In a preferred refinement, the moving together and the rotation take place in such a manner that the segments 14, 20 are moved beyond their actually desired end position, and therefore the wire is overbent at the transition regions 26. Subsequently, the segments 14, 20 are returned by a small distance by oppositely directed rotation into the end position shown in FIG. 6 where the fully bent wire 16 is removed.

For further details with regard to possible embodiments of the wire 16, the heads 28, the stator or another component of the electric machine and for possible drives or other components of the wave winding production apparatus, reference is made to citations [1] to [5].

FIG. 10 illustrates a further embodiment of the bending unit 10 in an illustration comparable to FIG. 3 in which the first holding element 12 and the second holding element 18 are in the end position. In this embodiment, the bending unit 10 is provided with at least one counterbending element 88, for example in the form of a punch 90, which is movable toward the holding elements 12, 18 and away therefrom.

The bending molds 22, 24 of the holding elements 12, 18 each have an indentation 92 on the rectilinear region 60 or instead of the rectilinear region 60.

The counterbending element 88 has a shaping surface with a further indentation 94 and projections 96 which adjoin the indentation 94 on both sides and lie opposite the indentations 92 of the holding elements 12, 18.

In the case of the bending operation which proceeds as has been explained with reference to the first embodiment using FIGS. 1 to 3, the counterbending element 88 is first of all pulled back until the end position according to FIG. 3 and here FIG. 10 has been reached. The counterbending element 88 is then moved toward the holding elements 12, 18. The projections 96 grasp the rectilinear sections 52, 54 and push the latter in the direction of the indentations 92 on the holding elements, as a result of which counterbends 98 are achieved.

Each bending unit 10 of the wave winding production apparatus is preferably provided with a counterbending element 88. These counterbending elements are provided displaceably at those locations where the bending units 10 are in the respective end position according to FIG. 6.

The features and characteristics explained here for individual embodiments can be combined as desired in order to form further embodiments, with it also being possible for features to be omitted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Bending unit
10-1 First bending unit 10-2 Second bending unit
12 First holding element
14 First segment
16 Wire
18 Second holding element
20 Second segment
22 First bending mold
24 Second bending mold
26 Transition region
28 Head
30 First (mechanical) control cam
32 Second (mechanical) control cam
34 Rolling cam
36 Rectilinear region (control cam)
38 Curved region (control cam)
40 Roll-away surface
42 First toothing
44 Second toothing
46 First bent region
48 Central bent region
50 Second bent region
52 First rectilinear section
54 Second rectilinear section
56 Guide groove
58 First curved region (bending mold)
60 Rectilinear region (bending mold)
62 Second curved region (bending mold)
64 Wave winding production apparatus
66 Bending device
68 Pivot point
70 Connecting element
72 Shaping element
74 First linear guide
76 Second linear guide
78 First carriage
80 Second carriage
82 Elastic component
84 Roller shoe
86 Ball bearing
88 Counterbending element
90 Punch
92 Indentation (on holding element)
94 Further indentation (on counterbending element)
96 Projection
98 Counterbend

The invention claimed is:

1. A bending unit for bending a bend of a wave winding for a coil winding of an electric machine, comprising:
a first holding element for holding a first segment of a wire to be bent,
a second holding element for holding a second segment of the wire to be bent, and
at least one bending mold for bending a transition region of the wire between the first segment and the second segment,
wherein the first and the second holding elements are in engagement with each other via at least one mechanical control cam to control a relative pivoting and a relative displacement of the first and the second holding element.

2. The bending unit as claimed in claim 1, wherein the at least one control cam, at least one of:
has regions of different curvature,
has a rectilinear region and a curved region,
has an ellipsoidal cam region differing from a circular shape,
has a curvature which increases in at least one of steps or gradually, as seen from one end region to another end region, or
is configured depending on the bending mold in such a manner that the wire is kept tensioned during an entire bending operation.

3. The bending unit as claimed in claim 1, wherein
at least part of the control cam or of one of a plurality of control cams is connected rigidly to the first holding element or to the second holding element or is formed on the first or the second holding element; or
all components of the control cam or of one of a plurality of control cams are connected rigidly to the first holding element or to the second holding element or are formed on the first or the second holding element.

4. The bending unit as claimed in claim 1, wherein the first holding element has a first control cam and the second holding element has a second control cam such that the first and second control cams roll away on each other as rolling cams.

5. The bending unit as claimed in claim 4, wherein complementary projection/recess formations and/or toothings are formed on the first and the second control cam to create a form-fitting engagement between the first and the second holding element.

6. The bending unit as claimed in claim 1, wherein a first region of the bending mold is formed on the first holding element and a second region of the bending mold is formed on the second holding element.

7. The bending unit as claimed in claim 6, wherein the first region and the second region of the bending mold at least one of:
each have at least one rectilinear region between two curved regions, or
are formed in a mirror-inverted manner with respect to each other.

8. The bending unit as claimed in claim 1, wherein the first and the second holding element at least one of:
each have a groove receptacle or guide groove for holding the first or second segment in place; or
are elastically prestressed in a direction of engagement with each other via at least one prestressing device.

9. The bending unit as claimed in claim 1, wherein the bending unit has a counterbending element for forming at least one counterbend which, when the first and second holding elements are pivoted with respect to each other in order to carry out the bending, is movable toward the holding elements in order to form the at least one counterbend on the wire between the holding elements and the counterbending element.

10. A bending device for forming a wave shape of a wave winding for a coil winding of an electric machine, comprising a first bending unit as claimed in claim 1 and a second bending unit as claimed in claim 1,
wherein one of the holding elements of the first bending unit and one of the holding elements of the second bending unit are connected to each other by means of a rigid connecting element which is rotatable about a pivot point.

11. The bending device as claimed in claim 10,
wherein the connecting element and the holding elements which are connected by the connecting element are formed integrally on a shaping element for shaping a rectilinear wire segment located between two bends.

12. A wave winding production apparatus for producing a wave winding for a coil winding of an electric machine, comprising a plurality of bending devices as claimed in claim 10, and at least one linear guide for at least one of the first holding elements,
the second holding elements,
the first bending units,
the second bending units,
the connecting elements, or
the shaping elements.

13. The wave winding production apparatus as claimed in claim 12, wherein respectively adjacent connecting elements or shaping elements are coupled by the engagement via the control cams of the bending units to synchronize their displacement movements along the at least one linear guide and rotational movements.

14. The wave winding production apparatus as claimed in claim 12, wherein at least one of:

pivot points of the connecting elements or shaping elements lie on a line running longitudinally or parallel to the linear movement direction;
at least two bending units which are adjacent in the linear movement direction are at least one of arranged or formed in a mirror-inverted manner; or
at least one or more elastic components are provided for holding together the connecting elements or shaping elements.

15. A bending method for bending a bend of a wave winding for a coil winding of an electric machine, comprising:

holding a first segment of a wire to be bent by means of a first holding element,
holding a second segment of the wire to be bent by means of a second holding element,
bending a transition region of the wire between the first segment and the second segment by means of a bending mold, and
controlling a relative pivoting and a relative displacement of the first and the second holding element during the bending of the transition region by means of a mechanical control cam via which the first and the second holding element are in engagement, and,
selecting the mechanical control cam depending on the bending mold to hold the transition region against the bending mold during a bending operation.

16. The bending method as claimed in claim 15, wherein the first and the second holding element are kept in engagement via the at least one control cam in such a manner that at least part of the control cam or of one of a plurality of control cams is connected rigidly to the first holding element or to the second holding element or is formed on the first or the second holding element, or
all components of the control cam or of one of a plurality of control cams are connected rigidly to the first holding element or to the second holding element or are formed on the first or the second holding element.

17. The bending method as claimed in claim 15, further comprising:

forming a counterbend on the wire via at least one counterbending element after relative pivoting of the holding elements has taken place.

18. A wave winding production method for producing a wave winding for a coil winding of an electric machine, comprising:

synchronously bending a plurality of bends via the bending method as claimed in claim 15 in bending units which follow one another in a longitudinal direction of the wire, and
each bending unit has the first holding element and the second holding element which are in engagement via the control cam,
wherein bending units following one another are coupled via rotatably and displaceably mounted rigid connecting elements.

19. A wave winding production method for producing a wave winding for a coil winding of an electric machine, comprising:

synchronously bending a plurality of bends in bending units which follow one another in a longitudinal direction of the wire via a bending method for bending a bend of a wave winding for a coil winding of an electric machine, comprising:
holding a first segment of a wire to be bent by means of the first holding element,
holding a second segment of the wire to be bent by means of the second holding element,
bending a transition region of the wire between the first segment and the second segment by means of a bending mold, and
controlling a relative pivoting and a relative displacement of the first and the second holding element during the bending of the transition region by means of a mechanical control cam via which the first and the second holding element are in engagement,
wherein the control cam is selected depending on the bending mold to hold the transition region against the bending mold during the bending operation, and
each bending unit has a first holding element and a second holding element which are in engagement via the control cam,
wherein bending units following one another are coupled via rotatably and displaceably mounted rigid connecting elements
further comprising
using a wave winding production apparatus as claimed in claim 12,
inserting or pulling the rectilinear wire into the wave winding production apparatus in an expanded state in which guide grooves on the holding elements or shaping elements are oriented with respect to one another,
uniformly moving together and oppositely rotating the connecting elements or shaping elements to bend the bends, and
removing the wire which has been bent to form a wave winding after a pushed-together end position is reached.

* * * * *